United States Patent
Tanaka et al.

(10) Patent No.: US 9,590,331 B2
(45) Date of Patent: Mar. 7, 2017

(54) CARD CONNECTOR

(71) Applicant: KABUSHIKI KAISHA TOSHIBA, Minato-ku, Tokyo (JP)

(72) Inventors: Akira Tanaka, Hamura Tokyo (JP); Masaya Hirashima, Ome Tokyo (JP); Satoru Yasui, Kokubunji Tokyo (JP); Mayumi Machino, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/799,433

(22) Filed: Jul. 14, 2015

(65) Prior Publication Data

US 2016/0118733 A1   Apr. 28, 2016

Related U.S. Application Data

(60) Provisional application No. 62/069,753, filed on Oct. 28, 2014.

(51) Int. Cl.
| | |
|---|---|
| *H01R 13/62* | (2006.01) |
| *H01R 12/70* | (2011.01) |
| *G06K 7/04* | (2006.01) |
| *H01R 13/24* | (2006.01) |
| *H01R 12/71* | (2011.01) |

(52) U.S. Cl.
CPC ............ *H01R 12/7076* (2013.01); *G06K 7/04* (2013.01); *H01R 13/2464* (2013.01); *H01R 12/716* (2013.01)

(58) Field of Classification Search
CPC .... G06K 13/08; G06K 7/0021; H01R 13/633; H01R 2103/00; H01R 24/58; H05K 5/0269

USPC ........ 439/159, 160, 188, 630, 946; 200/51.1
See application file for complete search history.

(56) References Cited

U.S. PATENT DOCUMENTS 5,882,230 A * 3/1999 Bricaud ............... G06K 7/0021
                                                        439/630
6,050,857 A * 4/2000 Lok .................... H01R 13/2442
                                                        439/630

(Continued)

FOREIGN PATENT DOCUMENTS

| JP | 2002-042933 | 2/2002 |
| JP | 2011-165560 | 8/2011 |
| JP | 2016-004618 A | 1/2016 |

OTHER PUBLICATIONS

Information Sheet listing Cite Nos. 1-3 and unpublished Foreign Related Japanese Application No. 2014-122413, filed Jun. 13, 2014, in 1 page.

*Primary Examiner* — Thanh Tam Le
(74) *Attorney, Agent, or Firm* — Knobbe, Martens, Olson & Bear LLP

(57) ABSTRACT

A card connector includes a base, a shell and a contact. The contact has a contact portion, a first elastic portion and a second elastic portion. The contact portion abuts an electrode of an IC card inserted into a slot between the base and the shell. The first elastic portion extends from the contact portion in an insertion direction of the IC card and has a first end fixed to the base. The second elastic portion extends from the contact portion in an ejection direction of the IC card and has a second end fixed to the base.

5 Claims, 9 Drawing Sheets

(56) References Cited

U.S. PATENT DOCUMENTS

| | | | | |
|---|---|---|---|---|
| 6,086,425 A * | 7/2000 | Lescoat | ............... | G06K 7/0021 |
| | | | | 235/441 |
| 6,454,607 B2 | 9/2002 | Bricaud | | |
| 6,561,851 B2 * | 5/2003 | Florescu | .............. | G06K 7/0021 |
| | | | | 439/159 |
| 7,494,381 B1 * | 2/2009 | Wu | ...................... | H01R 12/714 |
| | | | | 439/630 |
| 7,540,782 B2 * | 6/2009 | Takahashi | ............ | G06K 7/0021 |
| | | | | 439/630 |
| 7,566,233 B2 * | 7/2009 | Ting | ...................... | H01R 23/72 |
| | | | | 439/157 |
| 7,670,187 B2 * | 3/2010 | Ting | .................... | H01R 12/721 |
| | | | | 439/541.5 |
| 7,682,194 B2 * | 3/2010 | Lin | ...................... | G06K 7/0021 |
| | | | | 439/607.31 |
| 7,896,670 B1 * | 3/2011 | Gao | .................... | G06K 7/0021 |
| | | | | 439/159 |
| 8,147,262 B1 * | 4/2012 | Su | ..................... | G06K 13/0825 |
| | | | | 439/159 |

* cited by examiner

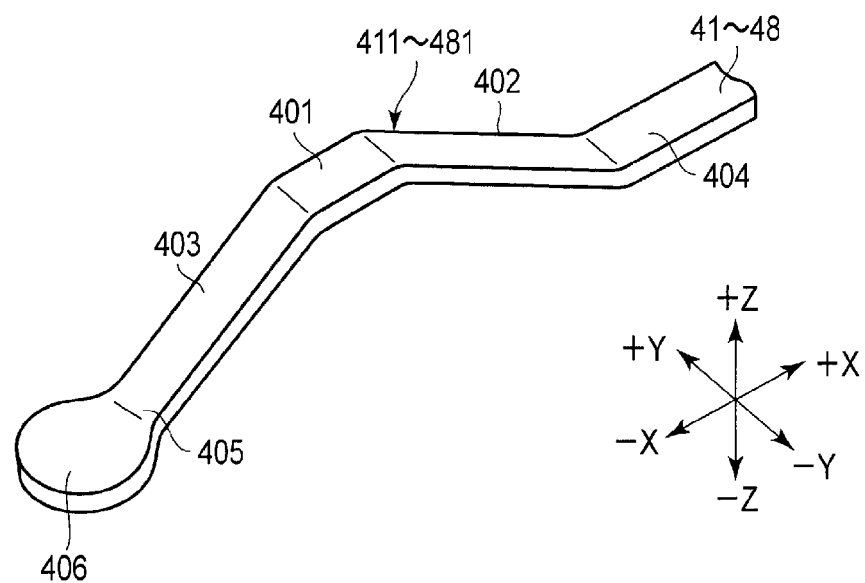
F I G. 7
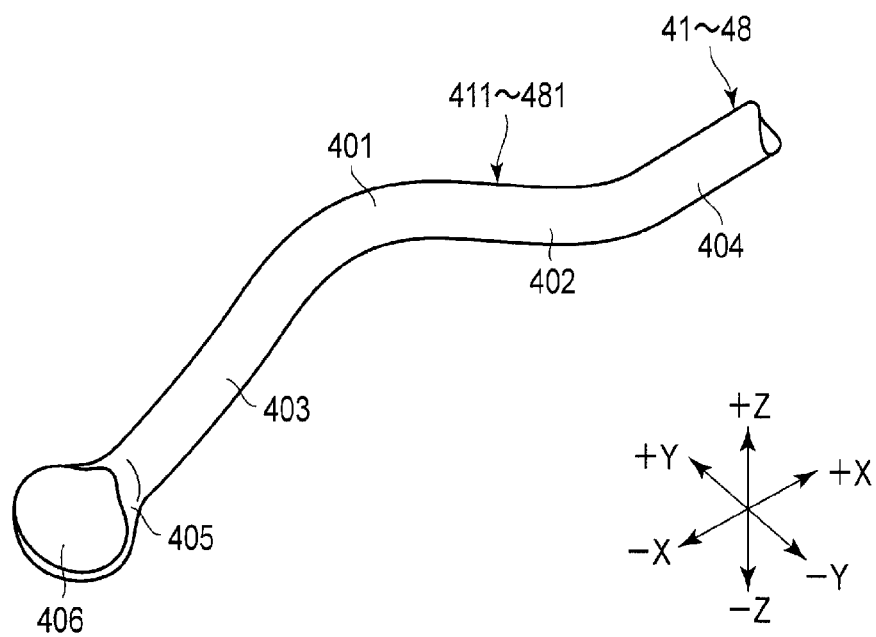
F I G. 8

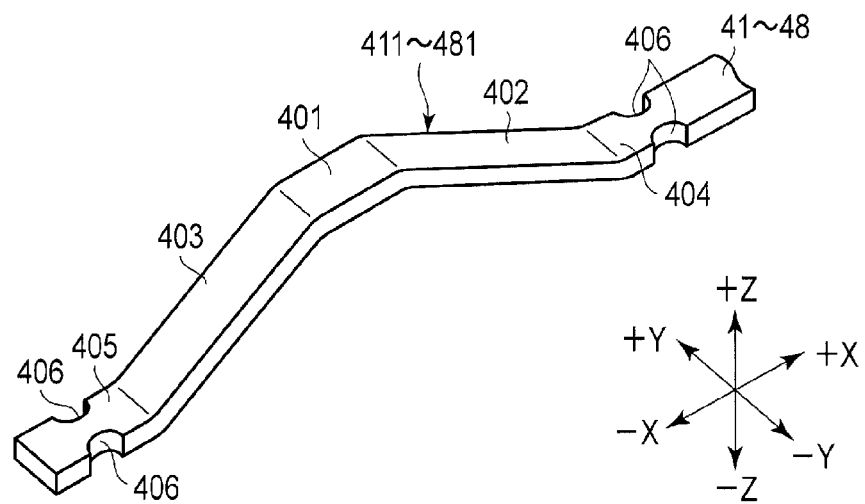
F I G. 9
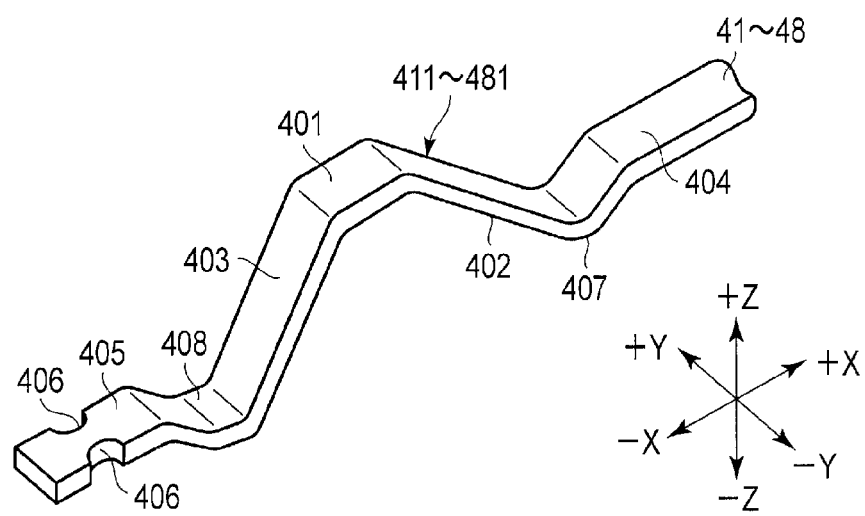
F I G. 10

CARD CONNECTOR

CROSS-REFERENCE TO RELATED APPLICATIONS

This application claims the benefit of U.S. Provisional Application No. 62/069,753, filed Oct. 28, 2014, the entire contents of which are incorporated herein by reference.

FIELD

Embodiments described herein relate generally to a card connector.

BACKGROUND

A card connector comprises a plurality of flexible contacts disposed for electrodes exposed to a surface of an IC card. The contacts are formed in the shape of cantilever springs extending in an insertion direction of the IC card from the front to the back.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 7 is a perspective view showing a contact of a card connector according to a third embodiment;

FIG. 8 is a perspective view showing a contact of a card connector according to a fourth embodiment;

FIG. 9 is a perspective view showing a contact of a card connector according to a fifth embodiment;

FIG. 10 is a perspective view showing a contact of a card connector according to a sixth embodiment;

DETAILED DESCRIPTION

Figure 1:
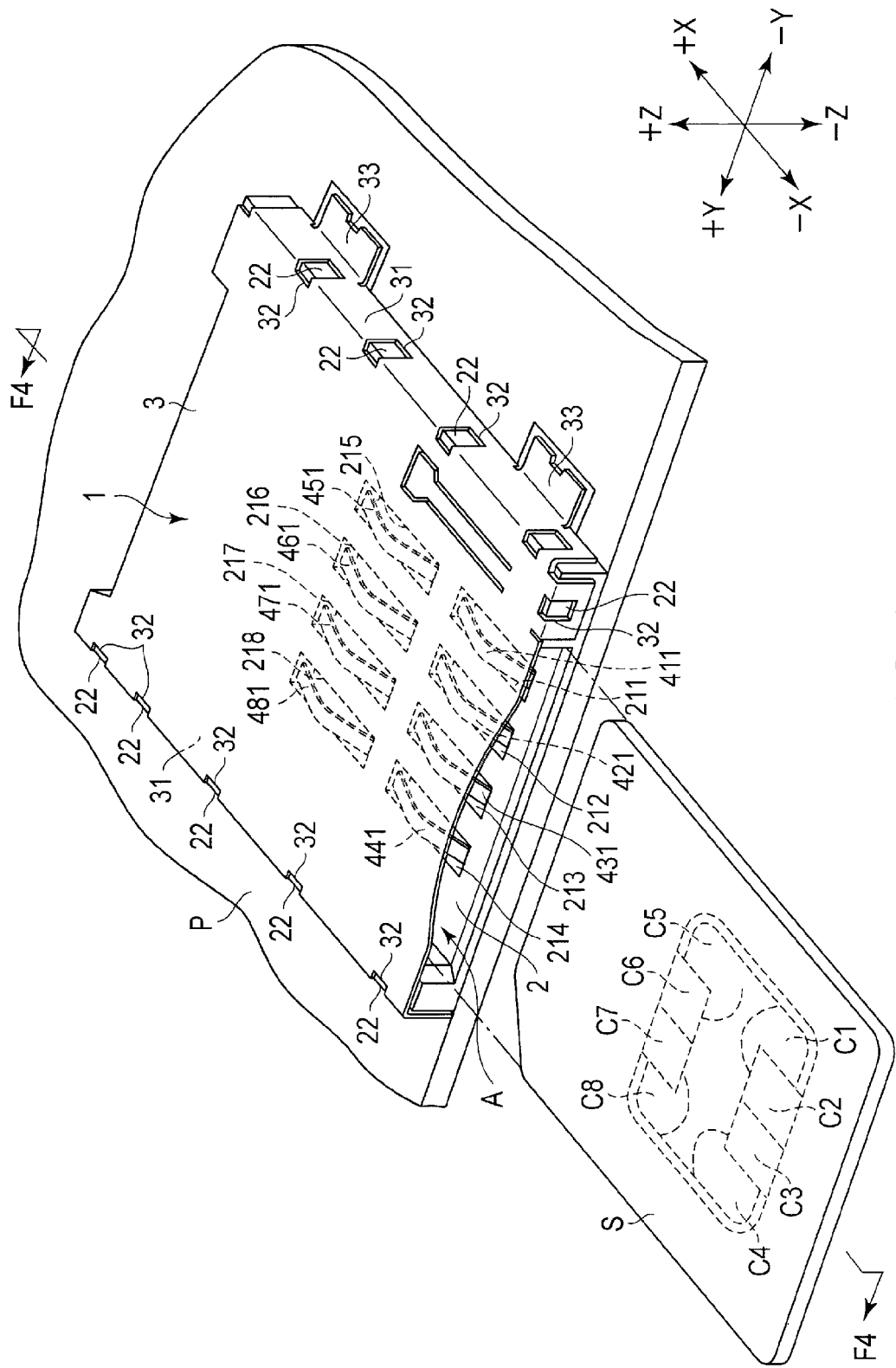
FIG. 1 is a perspective view of a card connector according to a first embodiment.

Various embodiments will be described hereinafter with reference to the accompanying drawings.

In general, according to one embodiment, a card connector comprises a base, a shell and a contact. The base includes synthetic resin, and has an external terminal disposed on a back side in an insertion direction of an IC card exposing an electrode to a surface. The shell includes metal, and forms a slot between the shell and the base into which the IC card is insertable. The contact comprises a contact portion, a first elastic portion and a second elastic portion. The contact portion abuts the electrode of the IC card inserted into the slot. The first elastic portion extends from the contact portion in the insertion direction of the IC card and has a first end fixed to the base. The second elastic portion extends from the contact portion in an ejection direction of the IC card and has a second end fixed to the base.

The IC card loaded into the slot of the card connector is a small IC card represented by a subscriber identification module (SIM) card storing information on a subscriber using a service in a mobile phone, a smartphone, a receiver of telecasts, a terminal of an electronic apparatus connected to the Internet, or the like, and is often used in the state of being loaded into an electronic apparatus used personally. The card connector is mounted on a printed wiring board of an electronic apparatus, and is used to read data stored in an IC chip contained in the IC card, to write data to the IC chip, or to use a function of the IC chip by directly touching the contact to the electrode exposed to the surface of the IC card.

In the electronic apparatus, as an electronic circuit has become denser and a data throughput speed has been improved, a heating value has also been increasing. If the electronic apparatus is repeatedly turned on and off, the temperature of the card connector also rises and falls repeatedly. With a change in the temperature, the card connector and the IC card loaded thereinto expand and contract repeatedly. There is a concern that depending on the structure of the card connector, the IC card is deformed repeatedly because of expansion and contraction, whereby the IC card may move in the slot.

Because the contact must correctly touch the electrode of the IC card, the card connector comprises a sensor for detecting that the IC card is correctly loaded, for example, a contact which is brought into conduction when the card is at a correct loaded position. When the direction of movement of the IC card accords with a direction in which it is ejected from the slot and the IC card moves to a position which cannot be detected by the sensor, the electronic apparatus makes a false recognition, as if the IC card were ejected.

To hold the IC card at a fixed position, there is a card connector in which the IC card is fixed by a frame surrounding its periphery, or in which a special lock mechanism is provided. However, by providing a mechanism dedicated to fixing the IC card, the structure of the card connector is complicated, the size of the connector is increased, and a manufacturing unit price rises. Considering that the card connector will be incorporated into an electronic apparatus, it is required that the card connector have a simple structure, be small, and be cheap in unit price. Therefore, it is desirable that even the card connector, which is exposed to repeated changes in temperature due to repeated operations and pauses of the electronic apparatus, have a simple structure and a small size and operate stably.

A card connector of one embodiment of the present embodiments excels conventional ones in that an IC card can be held at a fixed position even if it expands and contracts repeatedly with changes in temperature, and in that holding power increases as the temperature rises.

A card connector 1 according to a first embodiment will be described with reference to FIG. 1 to FIG. 5. FIG. 1 shows the card connector 1 mounted on a printed wiring board P and an IC card S loaded into the card connector 1. An example of the IC card S is a so-called contact IC card comprising eight electrodes C1 to C8 exposed to a surface.

This IC card S is widely used as a SIM card inserted into the card connector 1 provided in a mobile phone, a smartphone, a portable computer which can access the Internet, etc., or a SIM card provided in a television (also referred to as a B-CAS card [registered trademark] in Japan).

For the convenience of explanation, with respect to a direction (+X) in which the IC card S is inserted, a side which the IC card S is inserted from or ejected to (that is, a −X side) is defined as "front" or "this side", a side on which the inserted IC card S strikes (that is, a +X side) is referred to as "rear" or "back". In addition, "length" is defined in an insertion direction (X) of the IC card, "width" is defined in a direction (Y) intersecting the insertion direction along a plane where the electrodes C1 to C8 of the IC card S are arranged, and "thickness" is defined in a direction (Z) perpendicular to the electrodes C1 to C8 of the IC card S. When the card connector 1 is seen from the front side with a base 2 turned downward, the right side and the left side may be referred to as "right (−Y)" and "left (+Y)", respectively.

Figure 2:
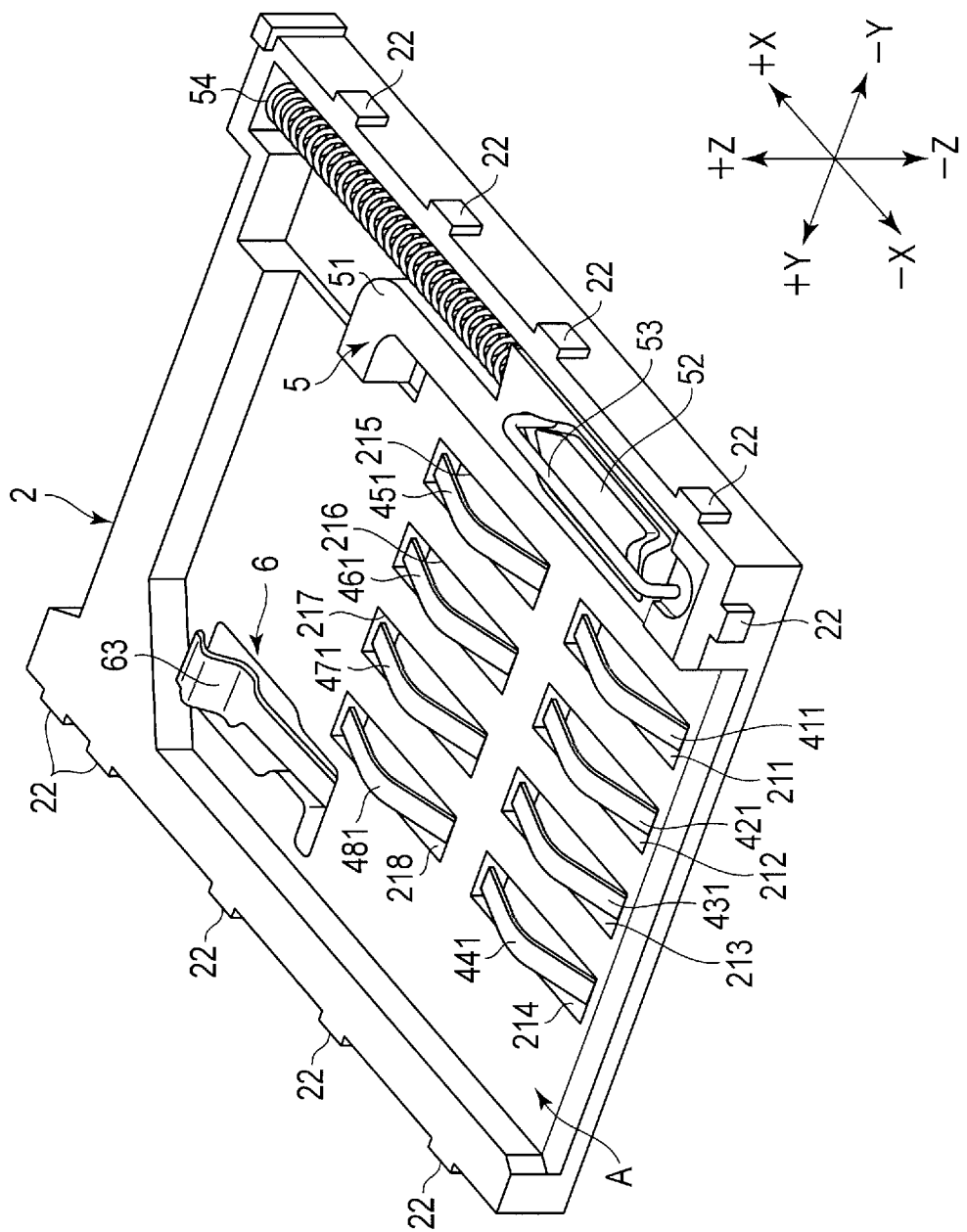
FIG. 2 is a perspective view showing the card connector of FIG. 1 with a shell detached therefrom.

The card connector 1 shown in FIG. 1 comprises the base 2 made of synthetic resin, a shell 3 made of metal, and contacts 411 to 481. FIG. 2 shows the card connector 1 in which the shell 3 is detached to show the arrangement of the contacts 411 to 481, an ejector 5 for ejecting the IC card S, and a switch 6 for detecting that the IC card S is correctly loaded.

Figure 3:
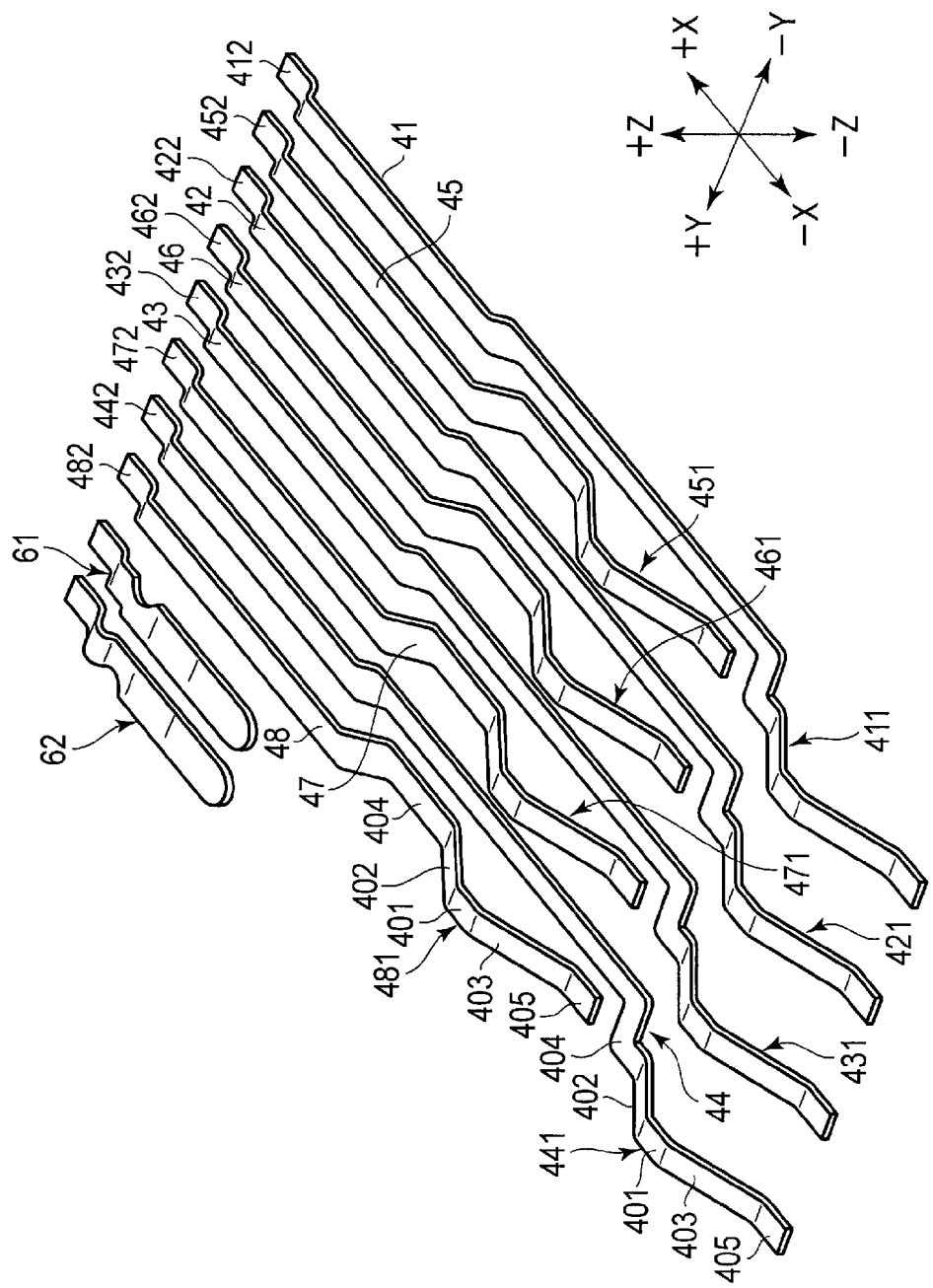
FIG. 3 is a perspective view showing electrodes of the card connector of FIG. 1.

FIG. 3 shows electrodes 41 to 48 and contacts 61 and 62 of the switch 6, which are incorporated into the base 2. The electrodes 41 to 48 comprise the contacts 411 to 481 formed on the front side and external terminals 412 to 482 formed on the back side, which are integrally molded by pressing, respectively. These electrodes are made of, for example, phosphor bronze widely used as a flat spring material or an electrode of an electronic component, and are plated on arbitrary portions of the surfaces or the entire surfaces.

In the base 2, the external terminals 412 to 482 shown in FIG. 3 are exposed and disposed on the back side in the insertion direction (+X) of the IC card S. The contacts 411 to 481 formed on the front sides of the respective electrodes 41 to 48 project from the base 2 to a region into which the IC card S is loaded as shown in FIG. 2. The contacts 411 to 481 are provided in the same number and in the same arrangement as the electrodes C1 to C8 exposed to the surface of the IC card S, and correspond thereto one by one. In the case of the card connector 1 of the present embodiment, the contacts 411 to 481 are arranged by twos on the front side (−X) and close to the center along the insertion direction, and in four lines in the width direction.

Figure 4:
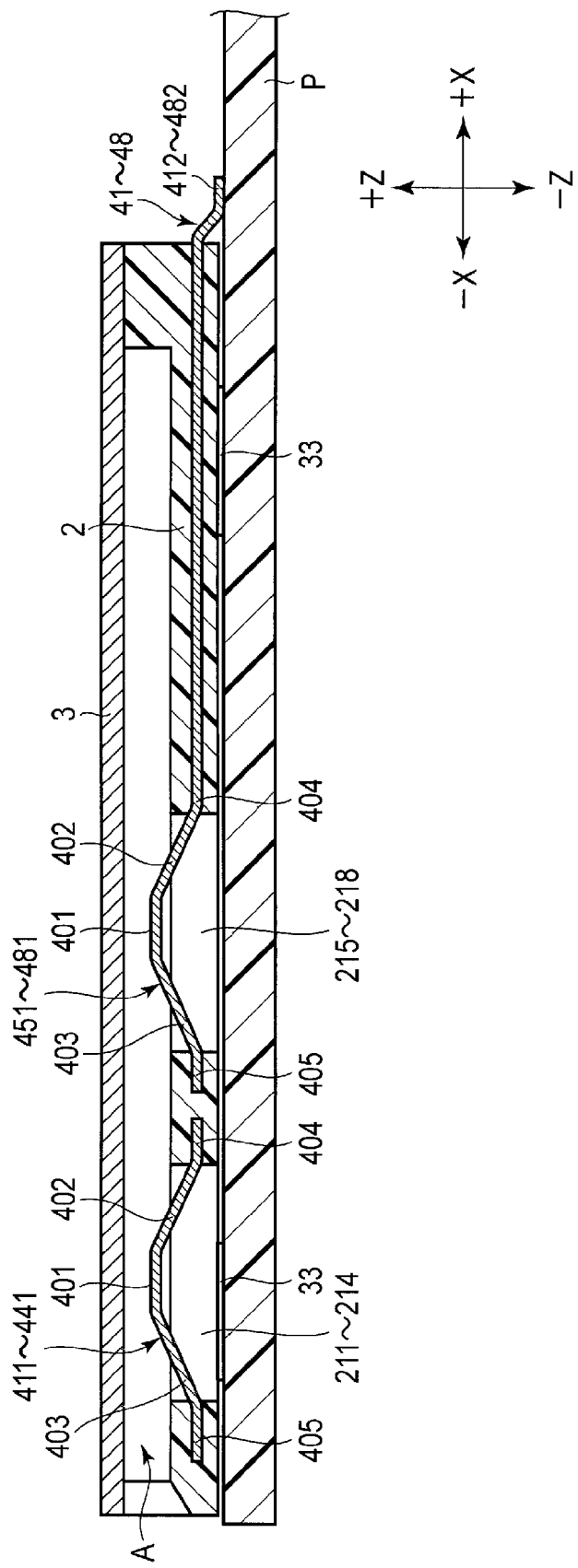
FIG. 4 is a cross-sectional view of the card connector along line F4-F4 in FIG. 1.

In this manner, the base 2 is molded by injection, so-called insert molding, embedding the electrodes 41 to 48 in the state where the contacts 411 to 481 and the external terminals 412 to 482 are exposed. FIG. 4 shows an XZ cross section of the card connector 1 along the insertion direction (+X) and the thickness direction (Z) indicated by line F4-F4 in FIG. 1. Two of the electrodes 41 to 48 are shown in FIG. 4. Details of the electrodes 41 to 48 will be described later.

As shown in FIG. 1, the shell 3 is attached to the base 2 to cover the region into which the IC card S is loaded, and forms a slot A into which the IC card S is inserted between itself and the base 2. The shell 3 is formed by die-cutting and bending a material which can be easily processed and has good corrosion resistance (for example, stainless steel) by pressing. Left and right side portions 31 of the shell 3 along the insertion direction of the IC card S are bent to cover the base 2, and comprise engagement holes 32 at a plurality of positions. The base 2 comprises engagement projections 22 on its outer periphery at positions corresponding to the engagement holes 32.

In addition, as shown in FIG. 1, the shell 3 comprises legs 33 for fixing the card connector 1 to the printed wiring board P at the side portions 31. The legs 33 are tabs extending from the side portions 31 of the shell 3 along the printed wiring board P in a direction away from the base 2. These legs 33 are brazed to electrodes (copper pads) prepared on the printed wiring board P with solders. Thus, as shown in FIG. 4, the base 2 is not directly fixed to the printed wiring board P, but is fixed to the printed wiring board P by the electrodes 41 to 48, the contacts 61 and 62, and the legs 33 of the shell 3.

Moreover, as shown in FIG. 2, the ejector 5 is assembled into the base 2 on the right side of the region into which the IC card S is loaded, and is a cam mechanism which is alternately displaced between a loaded state and an ejected state by means of a so-called heart cam 52. The ejector 5 comprises a movable block 51, the heart cam 52, an arm 53 and a spring 54. The movable block 51 engages with a corner of the IC card S inserted into the card connector 1, and moves in the insertion direction (+X) and the ejection direction (−X). The heart cam 52 is formed on the movable block 51. The arm 53 is jointed to a sidewall on the front side of the base 2, and a tip portion thereof engages with a groove of the heart cam 52. The spring 54 pushes the movable block 51 in the ejection direction (−X).

In the ejector 5 structured as described above, when the IC card S is inserted into the card connector 1 to the back, the arm 53 engages with the front side of the heart cam 52, and the IC card S is set in a loaded state of being accommodated in the card connector 1. Further, by further pushing the IC card S a little into the back from the loaded state, the arm 53 is detached from the front side of the heart cam 52 and can move to an end on the inner part. The spring 54 pushes the movable block 51 in the ejection direction (−X), whereby the IC card S is set in the ejected state of being pushed out of the card connector 1. The cam mechanism by the heart cam 52 disclosed in the present embodiment is an example of a mechanism which is alternately displaced. A mechanism other than the above-described cam mechanism may be provided as the ejector 5, or if the IC card S loaded into the card connector 1 can be directly pulled out, the ejector 5 is unnecessary.

As shown in FIG. 2, the switch 6 is located at the inner part on the left side which is opposite to the ejector 5 in the region where the IC card S is accommodated. FIG. 2 shows a coupler 63 of the switch 6, and FIG. 3 shows the contacts 61 and 62 connected by the coupler 63. The coupler 63 electrically connects the contacts 61 and 62 when the IC card S is located at a position where it is in the loaded state. It can be determined whether or not the IC card S is set at a correct position by confirming conduction between the contacts 61 and 62.

Figure 5:
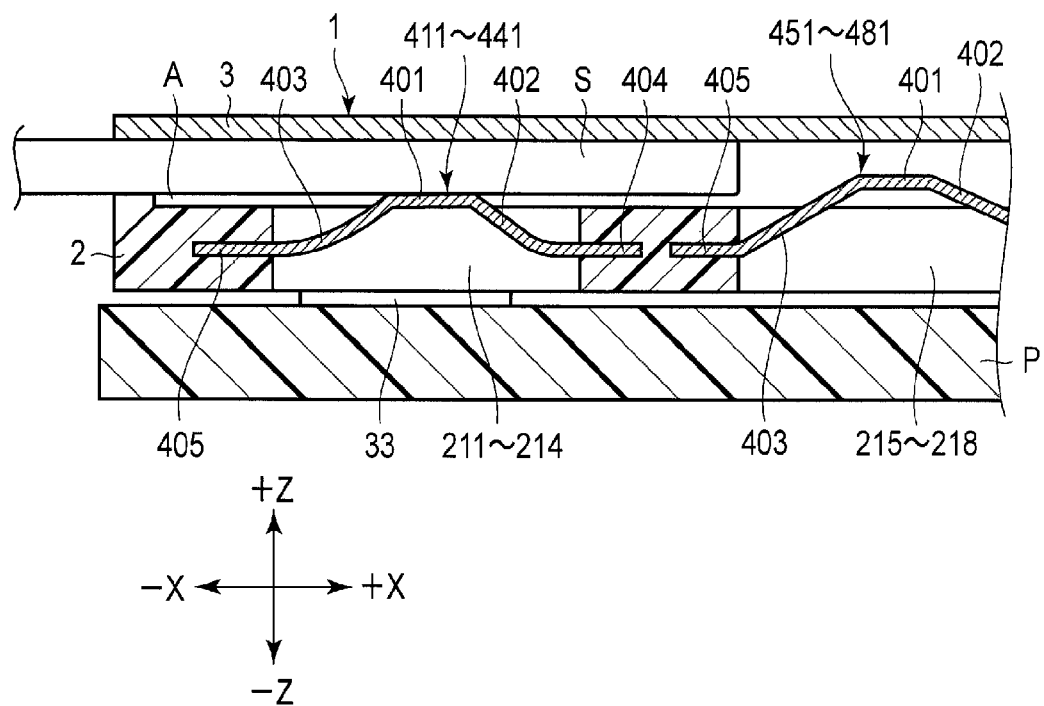
FIG. 5 is a cross-sectional view in which an IC card is partway inserted into the card connector of FIG. 4.

The contacts 411 to 481 will be described in detail with reference to FIG. 4 and FIG. 5. FIG. 4 shows the state where the IC card S is not loaded into the card connector 1, and FIG. 5 shows the state where the IC card S is partway inserted into the slot A of the card connector 1. As shown in FIG. 4, the contacts 411 to 481 are exposed to long holes 211 to 218 bored in the base 2 to correspond thereto, respectively, and comprise contact portions 401, first elastic portions 402 and second elastic portions 403, respectively.

The respective contact portions 401 abut and are electrically connected to the electrodes C1 to C8 of the IC card S inserted into the slot A. As shown in FIG. 4, the contact portions 401 are formed substantially flat to be in contact with the electrodes C1 to C8 over a predetermined length in the insertion direction (+X), that is, a length within the range of the corresponding electrodes C1 to C8. As shown in FIG. 5, their middle portions in the insertion direction may arc slightly toward the shell 3 so that they can deform a little when the IC card S is inserted.

The first elastic portions 402 extend from the contact portions 401 in the insertion direction (+X) of the IC card S, and extending first ends 404 thereof are fixed to the base 2. The second elastic portions 403 extend from the contact portions 401 in the ejection direction (−X) of the IC card S, and extending second ends 405 thereof are fixed to the base 2. That is, the first ends 404 and the second ends 405 on both sides of the contacts 411 to 481 are both fixed to the base 2. In the present embodiment, because the electrodes 41 to 48 are formed in the base 2 by insert molding as shown in FIG. 4, the first ends 404 and the second ends 405 are embedded in the base 2. As shown in FIG. 3 and FIG. 4, the contacts 411 to 481 are parts of the electrodes 41 to 48, and are bands having widths in the direction (Y) intersecting the insertion direction (X) of the IC card S. The first ends 404 of the first elastic portions 402 are connected to the external terminals 412 to 482. Sections between the first ends 404 of the first elastic portions 402 and the external terminals 412 to 482 are embedded in the base 2.

The first elastic portions 402 and the second elastic portions 403 extend substantially straight from the contact portions 401 projecting from the base 2 to the respective ends 404 and 405 embedded in the base 2 to be away from the shell 3. That is, the first elastic portions 402 and the second elastic portions 403 are disposed in symmetry at 180° with the contact portions 401 as the centers, and when the card connector 1 is seen in the thickness direction (Z) of the IC card S, the contact portions 401 are located on segments connecting the first ends 404 of the first elastic portions 402 and the second ends 405 of the second elastic portions 403.

Transition portions leading from the contact portions 401 to the first elastic portions 402 and transition portions leading from the contact portions 401 to the second elastic portions 403 may be slightly round. If they are round, the IC card S is easily inserted or ejected, and if they are not round, dirt, an oxide film, etc., adherent to the surfaces of the electrodes C1 to C8 of the IC card S are easily scraped off.

As shown in FIG. 5, when the IC card S is inserted into the slot A, the contact portions 401 are pushed into the side of the base 2, and the first elastic portions 402 and the second elastic portions 403 bend. Because the first ends 404 of the first elastic portions 402 and the second ends 405 of the second elastic portions 403 are both fixed to the base 2, there is no concern for the contacts 411 to 481 to buckle when the IC card S is inserted or ejected.

In the case of a conventional contact, in which either end is a fixed end and an opposite end is a free end provided with a contact portion in an insertion direction of an IC card (in general, frequently, the fixed end is on the insertion side and the free end is on the back side), there is no concern for the contact to buckle when the contact portion rubs an electrode of the IC card from the fixed end to the free end. However, in the case where the contact portion rubs the electrode of the IC card from the free end to the fixed end, when the electrode and the contact portion mesh and are stuck by slight dust, an oxide film, etc., the free end is pulled to the side of the fixed end, and the contact may buckle. Accordingly, in the case of such a so-called cantilever contact, it is necessary not to cause buckling by adjusting force of pressing the contact portion against the electrode of the IC card S. That is, the contact is designed not to add excessive force to the contact portion.

In the card connector 1 of the present embodiment, because both ends of the contacts 411 to 481 are fixed to the base 2, force of pressing the contact portions 401 against the electrodes C1 to C8 of the IC card S can be made larger than that in the case of a cantilever contact. In the card connector 1, the IC card S is interposed between the contacts 411 to 481 and the shell 3, thereby being held in the slot A. That is, in the card connector 1, force of holding the IC card S can be strengthened.

The card connector 1 of the first embodiment structured as described above is mounted on the printed wiring board P of an electronic apparatus as shown in FIG. 1. A number of electronic components are mounted on the printed wiring board P, and some of them generate heat while the electronic apparatus is in operation. When heat generated by the electronic components is conducted to the card connector 1, it expands in accordance with a coefficient of linear expansion of each member. In the card connector 1 of the present embodiment, because the base 2 is made of synthetic resin and the shell 3 is made of metal, the base 2 expands more.

At this time, although the shell 3 is soldered to the printed wiring board P as shown in FIG. 1, the base 2 is merely soldered to the printed wiring board P at the external terminals 412 to 482 as shown in FIG. 4. That is, the base 2 extends to the front side where the slot of the card connector 1 is open (that is, in the ejection direction [−X]), and expands to make the long holes 211 to 218 narrower. Because the engagement projections 22 are merely fitted into the engagement holes 32 of the shell 3, the base 2 is not restrained by the shell 3 even if it expands. Therefore, a stress caused by the expansion of the base 2 by heat does not concentrate on solders which connect the external terminals 412 to 482 to the printed wiring board P.

Further, the long holes 211 to 218 contract in the insertion direction (X) large in dimension. As a result, the contacts 411 to 481, the ends 404 and 405 of which are fixed to the base 2, are pressed and shrunk against the contact portions 401. Because the contact portions 401 of the contacts 411 to 481 more project toward the IC card S than the first ends 404 of the first elastic portions 402 and the second ends 405 of the second elastic portions 403, the force by which the contact portions 401 are pressed against the electrodes C1 to C8 of the IC card S increases when the base 2 expands as it heats. That is, in the card connector 1 of the present embodiment, when the electronic apparatus on which the card connector 1 is mounted is operated and the temperature rises, the force of holding the IC card S increases.

Further, the force of holding the IC card S is frictional force produced by the force of interposing the IC card S between the contacts 411 to 481 and the shell 3. As described above, when the card connector 1 expands as it heats, the base 2 more expands than the shell 3. Although the base 2 expands in the ejection direction (−X), the force by which the contacts 411 to 481 press the IC card S against the shell 3 also increases. At this time, because an area where the IC card S is in contact with the shell 3 is obviously larger than an area where the electrodes C1 to C8 of the IC card S are in contact with the contact portions 401 of the contacts 411 to 481, the contact portions 401 of the contacts 411 to 481 slide over the electrodes C1 to C8, and the IC card S is maintained in a loaded position without being pushed out of the slot A of the card connector 1 in the ejection direction (−X). In addition, when the electronic apparatus is in a pause state and the temperature falls, the base 2 of the card connector 1 contracts in the insertion direction (+X) with respect to the external terminals 412 to 482. The long holes 211 to 218 to which both ends of the contacts 411 to 481 are fixed enlarge, and although the force by which the contacts 411 to 481 press the IC card S against the shell 3 decreases, the force of holding the IC card S is not lost. Accordingly, the IC card S is maintained at a position in a loaded state.

In this manner, according to the card connector 1 of the present embodiment, the structure thereof is simple, and the size does not vary as compared to a conventional one. Moreover, even if the card connector 1 is mounted on the electronic apparatus and the temperature thereof rises and falls repeatedly due to repeated operations and pauses, the IC card S can be maintained at a loaded position without providing any special locking mechanism.

In the above description, the card connector 1 of the first embodiment has been described with the example of a card connector having a structure suitable for an IC card comprising eight electrodes which is often used as a SIM card incorporated into a mobile phone or a smartphone. If an IC card comprises six electrodes, contacts of a card connector are arranged to conform to the IC card. Moreover, the card connector may have a shape suitable for an IC card other than a SIM card, for example, an SD memory card, a mini SD memory card, or a micro SD memory card.

Furthermore, in Japan, there is a B-CAS card (registered trademark) as a SIM card used for specifying a receiver of telecasts and enabling the telecasts and pay broadcasts to be received. Also to this SIM card for telecast reception, the card connector 1 can be applied. In addition, there is an IC card loaded into vehicle-mounted equipment of an electronic toll collection system for automatically collecting tolls at the time of using toll roads. The card connector 1 of the present embodiment may be applied as a card connector into which this IC card is inserted.

Card connectors 1 of second to tenth embodiments will be each described hereinafter with reference to the corresponding drawings. Structures having the same functions as those of the card connector 1 of the first embodiment will be given the same symbols (including numbers, characters and marks) in the description of each of the embodiments. Regarding a detailed description of the structures which are given the same symbols as in the first embodiment, the description and the drawings of the first embodiment should be referred to. In the card connectors 1 of the second to tenth embodiments, the shapes of contacts 411 to 481 differ from those of the contacts 411 to 481 of the first embodiment. Accordingly, the shapes of the contacts 411 to 481 will be hereinafter described.

Figure 6:
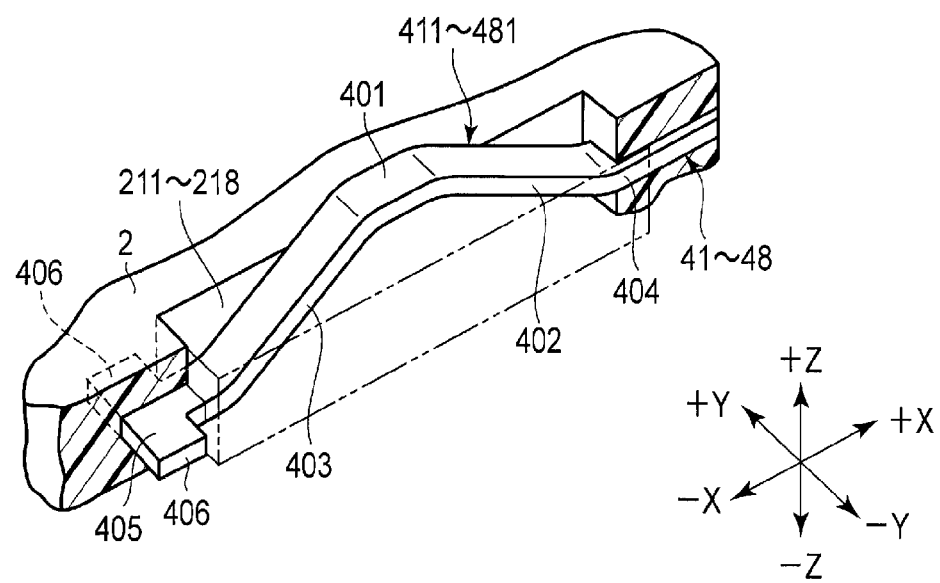
FIG. 6 is a perspective view showing a contact of a card connector according to a second embodiment.

The contacts 411 to 481 of the card connector 1 of the second embodiment will be described with reference to FIG. 6. At least one of a first end 404 of a first elastic portion 402 and a second end 405 of a second elastic portion 403 of each of the contacts 411 to 481, the second end 405 of the second elastic portion 403 in the present embodiment, comprise an anchor portion 406. In the contacts 411 to 481 shown in FIG. 6, the shape of the second end 405 of the second elastic portion 403 extending from a contact portion 401 to the front side (−X) of the card connector 1 differs from that in the contacts 411 to 481 of the first embodiment. The anchor portion 406 of FIG. 6 is deformed in the direction (Y) intersecting the direction to the contact portion 401 (that is, the insertion direction [X] of an IC card S).

In the present embodiment, the anchor portion 406 is a pad extending to the direction (Y) intersecting the insertion direction (X) of the IC card S. The anchor portion 406 having the shape of a pad is larger in width (Y) than the contacts 411 to 481 in the form of bands which similarly have widths in the direction (Y) intersecting the insertion direction (X) of the IC card S. As shown in FIG. 6, the anchor portion 406 is completely buried in a base 2. The anchor portion 406 anchors the second end 405 of the second elastic portion 403 in the base 2 to prevent it from coming out of the base 2, even if the base 2 expands as it heats or contracts as it cools.

Further, the anchor portion 406 may be provided at not only the second end 405 of the second elastic portion 403, but the first end 404 of the first elastic portion 402 extending from the contact portion 401 to the back side (+X) of the card connector 1. It suffices, if the anchor portion 406 remains in the base 2 to prevent the first ends 404 and the second ends 405 from coming out of the base 2 when the base 2 expands or contracts. Therefore, it also suffices, only if the anchor portion 406 widens in either (+Y or −Y) in the width direction (Y). In addition, it may comprise a sagittal return.

The contacts 411 to 481 of the card connector 1 of the third embodiment will be described with reference to FIG. 7. At least one of a first end 404 of a first elastic portion 402 and a second end 405 of a second elastic portion 403 of each of the contacts 411 to 481, the second end 405 of the second elastic portion 403 in the present embodiment, comprises an anchor portion 406. In the contacts 411 to 481 shown in FIG. 7, the shape of the second end 405 of the second elastic portion 403 extending from a contact portion 401 to the front side (−X) of the card connector 1 differs from that in the contacts 411 to 481 of the other embodiments. The anchor portion 406 shown in FIG. 7 is deformed in the direction (Y) intersecting the direction to the contact portion 401 (that is, the insertion direction [X] of an IC card S).

In the present embodiment, the anchor portion 406 is a pad widening in the direction (Y) traversing the insertion direction (X) of the IC card S, and is round. The anchor portion 406 having the shape of a round pad is larger in width (Y) than that of the contacts 411 to 481 in the form of bands having widths in the direction (Y) intersecting the insertion direction (X) of the IC card S. The anchor portion 406 is completely buried and molded in a base 2 as in the second embodiment. The anchor portion 406 anchors the second end 405 of the second elastic portion 403 in the base 2 to prevent it from coming out of the base 2 even if the base 2 expands as it heats or contracts as it cools.

The contacts 411 to 481 of the card connector 1 of the fourth embodiment will be described with reference to FIG. 8. The contacts 411 to 481 shown in FIG. 8 are each made of a solid wire comprising a first elastic portion 402 and a second elastic portion 403 which are bent in the direction away from electrodes C1 to C8 of an IC card S with respect to a contact portion 401. In addition, a center portion of the contact portion 401 in the insertion direction of the IC card S smoothly projects to the side of the electrodes C1 to C8.

Further, as in the second and third embodiments, at least one of a first end 404 of the first elastic portion 402 and a second end 405 of the second elastic portion 403 of each of the contacts 411 to 481, the second end 405 of the second elastic portion 403 in the present embodiment, comprises an anchor portion 406. The anchor portion 406 shown in FIG. 8 is deformed in the direction (Y) intersecting the direction to the contact portion 401 (that is, the insertion direction [X] of the IC card S).

In the present embodiment, the anchor portion 406 is a pad extending to the direction (Y) intersecting the insertion direction (X) of the IC card S, and is round. The anchoring portion 406 is larger in outer diameter than the contacts 411 to 481, which are solid wires, and is made by being flattened by pressing. The anchor portion 406 is completely buried and molded in a base 2 as in the second embodiment. The anchor portion 406 anchors the second end 405 of the second elastic portion 403 in the base 2 to prevent it from coming out of the base 2 even if the base 2 expands as it heats or contracts as it cools.

The contacts 411 to 481 of the card connector 1 of the fifth embodiment will be described with reference to FIG. 9. At least one of a first end 404 of a first elastic portion 402 and a second end 405 of a second elastic portion 403 of each of the contacts 411 to 481, both the first end 404 of the first elastic portion 402 and the second end 405 of the second elastic portion 403 in the present embodiment, comprise an anchor portion 406. In the contacts 411 to 481 shown in FIG. 9, the shapes of the first end 404 of the first elastic portion 402 extending from a contact portion 401 to the back side (+X) of the card connector 1 and the second end 405 of the second elastic portion 403 extending from the contact portion 401 to the front side (−X) of the card connector 1 differ from those of the contacts 411 to 481 of the other embodiments. The anchor portions 406 shown in FIG. 9 are deformed in the direction (Y) intersecting the direction to the contact portion 401 (that is, the insertion direction [X] of an IC card S).

In the present embodiment, the contacts 411 to 481 are in the form of bands having widths in the direction (Y) intersecting the insertion direction (X) of the IC card S, and the anchor portions 406 are constricted in the direction (Y) intersecting the insertion direction (X) of the IC card S. The anchoring portions 406 are constricted in the intersecting direction (Y) on both sides, but may be constricted only on either side. The anchor portion 406 are completely buried and molded in a base 2 as in the second embodiment. The anchor portions 406 anchor the first end 404 of the first elastic portion 402 and the second end 405 of the second elastic portion 403 in the base 2 to prevent them from coming out of the base 2 even if the base 2 expands as it heats or contracts as it cools.

The contacts 411 to 481 of the card connector 1 of the sixth embodiment will be described with reference to FIG. 10. The contacts 411 to 481 shown in FIG. 10 are in the form of bands having widths in the direction (Y) intersecting the insertion direction (X) of an IC card S, and a first elastic portion 402 and a second elastic portion 403 comprise valley portions 407 and 408 displaced in the direction (−Z) farther from the contact portion 401 than respective ends 404 and 405. In addition, at least one of the first end 404 of the first elastic portion 402 and the second end 405 of the second elastic portion 403 of each of the contacts 411 to 481, the second end 405 of the second elastic portion 403 in the present embodiment, comprises an anchor portion 406. The anchor portion 406 shown in FIG. 10 is constricted in the direction (Y) intersecting the insertion direction (X) of the IC card S as the anchor portion 406 of the contacts 411 to 481 shown in FIG. 9 in the fifth embodiment. The anchor portion 406 is completely buried and molded in a base 2 as in the second embodiment. The anchor portion 406 anchors the second end 405 of the second elastic portion 403 in the base 2 to prevent it from coming out of the base 2 even if the base 2 expands as it heats or contracts as it cools.

Furthermore, since the contacts 411 to 481 comprise the valley portions 407 and 408 proximal the first elastic portion 402 and the second elastic portion 403, respectively, the force of pressing electrodes C1 to C8 of the IC card S when the base 2 expands or contracts can be adjusted by the valley portions 407 and 408.

Figure 11:
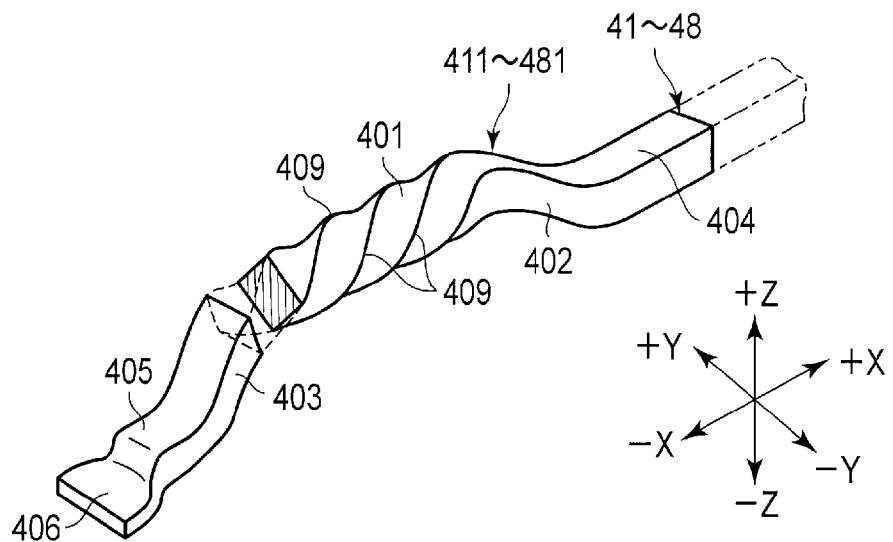
FIG. 11 is a perspective view showing a contact of a card connector according to a seventh embodiment.

The contacts 411 to 481 of the card connector 1 of the seventh embodiment will be described with reference to FIG. 11. The contacts 411 to 481 shown in FIG. 11 are each a polygonal bar having a polygonal cross section, a quadrangular cross section in the present embodiment. In addition, a contact portion 401 is twisted. The contacts 411 to 481 each have a shape projecting to the side of an IC card S as in the other embodiments. Further, at least one of a first end 404 of a first elastic portion 402 and a second end 405 of a second elastic portion 403 of each of the contacts 411 to 481, the second end 405 of the second elastic portion 403 in the present embodiment, comprises an anchor portion 406.

The anchor portion 406 shown in FIG. 11 is deformed in the direction (Y) intersecting the direction to the contact portion 401 (that is, the insertion direction [X] of the IC card S). In the present embodiment, the anchor portion 406 is a pad extending to the direction (Y) intersecting the insertion direction (X) of the IC card S, and is substantially quadrangular. The anchor portion 406 is made by being flattened by pressing to be larger in the width direction (Y) than the contacts 411 to 481 having the shape of polygonal bars. The anchor portion 406 is completely buried and molded in a base 2 as in the second embodiment. The anchor portion 406 anchors the second end 405 of the second elastic portion 403 in the base 2 to prevent it from coming out of the base 2 even if the base 2 expands as it heats or contracts as it cools.

Further, on the contact portion 401 made by twisting a polygonal bar, edges 409 of the polygonal bar appear spirally. The edges 409 have a function of scraping off dirt or an oxide film adherent to the surfaces of electrodes C1 to C8 of the IC card S when the IC card S is inserted or ejected. The edges 409 are spiral, and thus, are hard to snag on when the IC card S is being inserted or ejected, and dirt or an oxide film which has been scraped off is easily swept out from between the electrodes C1 to C8 of the IC card S and the contact portion 401.

Figure 12:
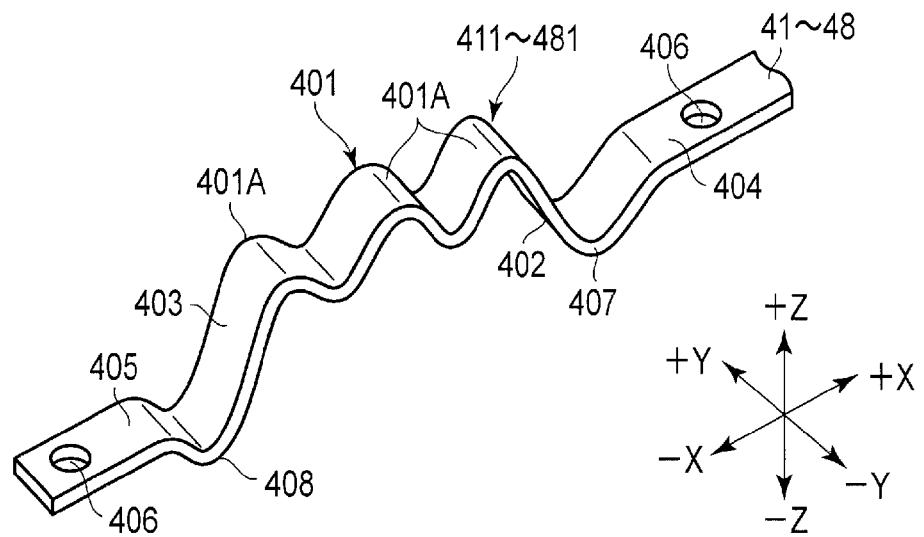
FIG. 12 is a perspective view showing a contact of a card connector according to an eighth embodiment.

The contacts 411 to 481 of the card connector 1 of the eighth embodiment will be described with reference to FIG. 12. The contacts 411 to 481 shown in FIG. 12 are in the form of bands having widths in the direction (Y) intersecting the insertion direction (X) of an IC card S, and a first elastic portion 402 and a second elastic portion 403 comprise valley portions 407 and 408 displaced in the direction (−Z) farther from the contact portion 401 than respective ends 404 and 405, and a plurality of waved projections 401A along the insertion direction (X) of the IC card S. Even if the dimension of each component of the card connector 1 varies due to a manufacturing tolerance, since the valley portions 407 and 408 are provided, the force of pressing a contact portion 401 against electrodes C1 to C8 of the IC card S can be prevented from strengthening more than necessary. Moreover, since the contact portion 401 comprises the plurality of projections 401A, the contacts 411 to 481 obtain a function of removing dirt or an oxide film adherent to the surfaces of the electrodes C1 to C8 of the IC card S by sliding as in the seventh embodiment.

Further, at least one of the first end 404 of the first elastic portion 402 and the second end of the second elastic portion 403, both the ends 404 and 405 in the present embodiment, comprise anchor portions 406, respectively. The anchor portions 406 shown in FIG. 12 are holes pierced in the thickness direction (Z) of the contacts 411 to 481. The anchor portions 406 are completely buried and molded in a base 2 as in the second embodiment. The anchor portions 406 anchor the first end 404 of the first elastic portion 402 and the second end 405 of the second elastic portion 403 in the base 2 to prevent them from coming out of the base 2 even if the base 2 expands as it heats or contracts as it cools. The anchor portions 406 may be projections projecting in the thickness direction (Z) to the side (+Z) of a shell 3 or to the side (−Z) away from the shell 3, instead of pierced holes.

Figure 13:
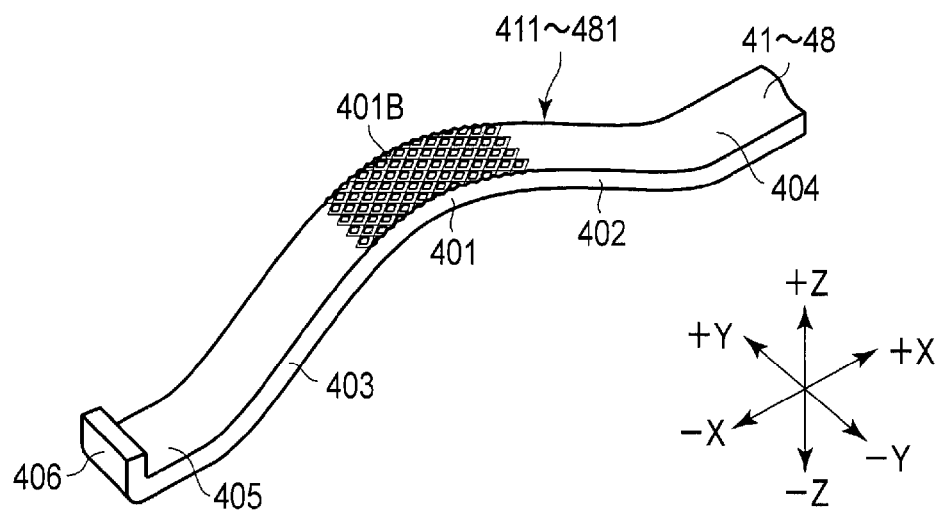
FIG. 13 is a perspective view showing a contact of a card connector according to a ninth embodiment.

The contacts 411 to 481 of the card connector 1 of the ninth embodiment will be described with reference to FIG. 13. The contacts 411 to 481 shown in FIG. 13 are in the form of bands having widths in the direction (Y) intersecting the insertion direction (X) of an IC card S, and a contact portion 401, a first elastic portion 402 and a second elastic portion 403 make a gentle arc. The contact portion 401 comprises a rough surface (so-called knurling) 401B on a surface facing electrodes C1 to C8 of the IC card S. Since the contact portion 401 comprises the rough surface 401B, the contacts 411 to 481 have a function of removing dirt or an oxide film adherent to the surfaces of the electrodes C1 to C8 of the IC card S by sliding when the IC card S is inserted or ejected.

In addition, at least one of a first end 404 of the first elastic portion 402 and a second end 405 of the second elastic portion 403 of each of the contacts 411 to 481, the second end 405 of the second elastic portion 403 as shown in FIG. 13 in the present embodiment, comprises an anchor portion 406. The anchor portion 406 shown in FIG. 13 is a tab bent in the thickness direction (Z) of the contacts 411 to 481, in the direction (+Z) to a shell 3 here. The anchor portion 406 may be bent in the opposite direction (−Z) to the shell 3. The anchor portion 406 is completely buried or molded in a base 2 as in the second embodiment. The anchor portion 406 anchors the second end 405 of the second elastic portion 403 in the base 2 to prevent it from coming out of the base 2 even if the base 2 expands as it heats or contracts as it cools.

Figure 14:
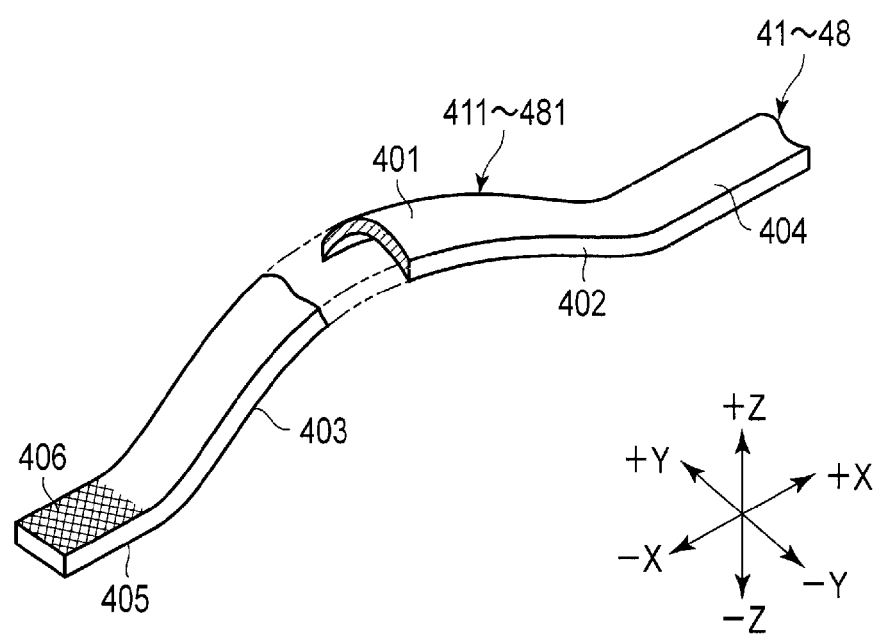
FIG. 14 is a perspective view showing a contact of a card connector of a tenth embodiment.

The contacts 411 to 481 of the card connector 1 of the tenth embodiment will be described with reference to FIG. 14. The contacts 411 to 481 shown in FIG. 14 are in the form of bands having widths in the direction (Y) intersecting the insertion direction (X) of an IC card S, and a contact portion 401, a first elastic portion 402 and a second elastic portion 403 make a gentle arc. Moreover, in the present embodiment, as shown in FIG. 14, a center portion of the contact portion 401 in the direction (Y) intersecting the insertion direction (X) of the IC card S is bulged toward electrodes C1 to C8 of the IC card S, that is, in the direction (+Z) to a shell 3. That is, the contact portion 401 is formed on a curved surface projecting toward the electrodes C1 to C8. The contact portion 401 does not easily snag on when the IC card S is being inserted or ejected.

Further, at least one of a first end 404 of the first elastic portion 402 and a second end 405 of the second elastic portion 403 of each of the contacts 411 to 481, the second end 405 of the second elastic portion 403 in the present embodiment, comprises an anchor portion 406. The anchor portion 406 shown in FIG. 14 is a rough surface formed on an outer surface of the second end 405, a so-called knurling. Although the rough surface is on a surface on the side (+Z) where the contact portion 401 projects in FIG. 14, the rough surface is also formed on a surface on the opposite side (−Z) in the thickness direction similarly. The anchor portion 406 is completely buried and molded in a base 2 as in the second embodiment. The anchor portion 406 anchors the second end 405 of the second elastic portion 403 in the base 2 to prevent it from coming out of the base 2 even if the base 2 expands as it heats or contracts as it cools.

In this specification, "electronic apparatus" includes various electronic apparatuses equipped with card connectors, such as electronic apparatuses installed indoors or outdoors and electronic apparatuses installed in vehicles, aircrafts, vessels, spacecrafts, etc., as well as portable electronic apparatuses which can be carried by users.

Moreover, although the contacts 411 to 481 having different shapes have been disclosed in the card connectors 1 of the first to tenth embodiments, implementing the embodiments by combining the respective shapes is also included in a part of the invention. The shapes of the first ends 404 of the first elastic portions 402 and the second ends 405 of the second elastic portions 403 of the contacts 411 to 481 can be replaced by those of any of the embodiments, and the shapes of two or more of the embodiments can be adopted at the same time. In each figure of the above-described embodiments, the thicknesses of contacts 411 to 481 may be drawn more thickly than those in reality. Further, the peaks of the contacts 411 to 481 themselves may be drawn larger or smaller than in reality.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A card connector comprising:

a base comprising synthetic resin, the base including an external terminal disposed on a back side in an insertion direction of an IC card;

a shell comprising metal, the shell configured to form a slot between the shell and the base into which the IC card is insertable; and a contact comprising a contact portion abutting an electrode which is exposed from a surface of the IC card when the IC card is inserted into the slot, a first elastic portion extending from the contact portion in the insertion direction of the IC card and comprising a first end which is embedded in the base to be fixed to the base, and a second elastic portion extending from the contact portion in an ejection direction of the IC card and comprising a second end which is embedded in the base to be fixed to the base, the contact which is continuously formed from the first end to the second end via the contact portion.

2. The card connector of claim 1, wherein the first end is connected to the external terminal, and a section between the first end and the external terminal is embedded in the base.

3. The card connector of claim 1, wherein the first elastic portion and the second elastic portion are disposed in symmetry at 180 degree with the contact portion as the center.

4. The card connector of claim 3, wherein the contact comprises a first transition portion leading from the contact portion to the first elastic portion and a second transition portion leading from the contact portion to the second elastic portion, and the first transition portion and the second transition portion are slightly round.

5. The card connector of claim 1, wherein
the shell comprises a leg at a side portion, the leg soldered on an electrode provided on a printed wiring board which is disposed under the base and is connected to the external terminal.

* * * * *